(12) United States Patent
Nagano et al.

(10) Patent No.: US 8,319,928 B2
(45) Date of Patent: Nov. 27, 2012

(54) LIQUID CRYSTAL DISPLAY DEVICE AND METHOD OF MANUFACTURING THE SAME

(75) Inventors: Shingo Nagano, Tokyo (JP); Yuichi Masutani, Tokyo (JP); Toshio Araki, Kumamoto (JP); Osamu Miyakawa, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 95 days.

(21) Appl. No.: 12/369,332

(22) Filed: Feb. 11, 2009

(65) Prior Publication Data

US 2009/0207362 A1 Aug. 20, 2009

(30) Foreign Application Priority Data

Feb. 15, 2008 (JP) ................................ 2008-034952

(51) Int. Cl.
G02F 1/1343 (2006.01)
(52) U.S. Cl. ........................................................ 349/141
(58) Field of Classification Search .................... None
See application file for complete search history.

(56) References Cited

U.S. PATENT DOCUMENTS

| 6,449,026 | B1 | 9/2002 | Min et al. |
| 6,809,789 | B2 | 10/2004 | Kim et al. |
| 7,362,394 | B2 * | 4/2008 | Kobayashi .................... 349/106 |
| 7,489,380 | B2 | 2/2009 | Lim et al. |
| 2001/0007779 | A1 | 7/2001 | Lee et al. |
| 2001/0046027 | A1 | 11/2001 | Tai et al. |
| 2002/0041354 | A1 | 4/2002 | Noh et al. |
| 2002/0154262 | A1 * | 10/2002 | Yamakita et al. ............. 349/141 |
| 2003/0043327 | A1 * | 3/2003 | Aoyama et al. ............... 349/141 |
| 2003/0117558 | A1 * | 6/2003 | Kim et al. ..................... 349/141 |
| 2004/0169808 | A1 * | 9/2004 | Shih et al. ..................... 349/141 |
| 2004/0212761 | A1 * | 10/2004 | Kadotani et al. .............. 349/110 |
| 2005/0078262 | A1 * | 4/2005 | Ono et al. ...................... 349/141 |
| 2007/0052900 | A1 * | 3/2007 | Cho et al. ...................... 349/141 |
| 2008/0007666 | A1 * | 1/2008 | Takeda et al. .................. 349/43 |
| 2008/0186440 | A1 | 8/2008 | Lim et al. |
| 2010/0187532 | A1 | 7/2010 | Nagano et al. |

FOREIGN PATENT DOCUMENTS

| JP | 2001-56474 | 2/2001 |
| JP | 2001-83540 | 3/2001 |
| JP | 2001-174818 | 6/2001 |

(Continued)

OTHER PUBLICATIONS

U.S. Appl. No. 12/401,226, filed Mar. 10, 2009, Nagano, et al.
U.S. Appl. No. 12/689,575, filed Jan. 19, 2010, Nagano et al.
Office Action issued May 15, 2012 in Japanese Patent Application No. 2008-34952 filed Feb. 15, 2008, (with Partial Translation of Office Communication).

(Continued)

Primary Examiner — Thanh-Nhan P. Nguyen
(74) Attorney, Agent, or Firm — Oblon, Spivak, McClelland, Maier & Neustadt, L.L.P.

(57) ABSTRACT

The liquid crystal display device, in which liquid crystal is filled between a TFT array substrate having a TFT and a counter substrate placed opposite to the TFT array substrate, includes a pixel electrode placed at least partly directly over or under a drain electrode of the thin film transistor so as to directly overlap the drain electrode, an interlayer insulating layer placed to cover the pixel electrode, and a counter electrode placed on the interlayer insulating layer and having a slit to generate a fringe electric field with the pixel electrode, wherein the counter electrode is placed to overlap a gate line connected to a gate electrode of the TFT in at least part of area and connected to the counter electrode in an adjacent pixel across the gate line.

20 Claims, 7 Drawing Sheets

FOREIGN PATENT DOCUMENTS

| | | |
|---|---|---|
| JP | 2001-235763 | 8/2001 |
| JP | 2002-182230 | 6/2002 |
| JP | 2002-221726 | 8/2002 |
| JP | 2007-233317 | 9/2007 |
| JP | 2007-334317 | 12/2007 |
| JP | 2008-52161 | 3/2008 |
| JP | 2008-191669 | 8/2008 |

OTHER PUBLICATIONS

Office Action issued Oct. 2, 2012 in Japanese Application No. 2008-034952 filed Feb. 15, 2008 (w/Partial English translation).

* cited by examiner

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and a method of manufacturing the same and, particularly, to a fringe-field switching mode liquid crystal display device and a method of manufacturing the same.

2. Description of Related Art

An in-plane switching (IPS) mode of a liquid crystal display device is a display technique that displays an image by applying an in-plane electric field to liquid crystal placed between substrates. The IPS mode provides better viewing angle characteristics than a twisted nematic (TN) mode, and it is expected to meet the demand for high quality pictures.

An IPS mode liquid crystal display device generally has a structure in which a pixel electrode and a counter electrode are formed by metal films and arranged opposite to each other on the same substrate. In the liquid crystal display device having such a structure, it is difficult to increase a pixel aperture ratio compared with the TN mode, thus having low light use efficiency.

In order to improve the aperture ratio and the transmittance in the IPS mode liquid crystal display device, a fringe-field switching (FFS) mode has been proposed (e.g. Japanese Unexamined Patent Applications Nos. 2001-235763 and 2002-182230). An FFS mode of a liquid crystal display device is a display technique that displays an image by applying a fringe electric field to liquid crystal placed between substrates. Because a pixel electrode and a counter electrode are formed by transparent conductive layers in the FFS mode liquid crystal display device, the aperture ratio and the transmittance are higher than those of the IPS mode. Further, because capacitance is formed between the transparent conductive layers in the FFS mode liquid crystal display device, there is no loss of transmittance due to a capacitance forming portion.

In the FFS mode liquid crystal display device according to related art, liquid crystal is driven by a fringe electric field that is generated between the pixel electrode having a slit placed in an upper layer and the counter electrode placed in a lower layer with an insulating layer interposed therebetween. The pixel electrode is placed away from the source line in each pixel so as not to overlap the source line in order to reduce the capacitance between the source line and the pixel electrode. Specifically, the pixel electrode is placed at a certain distance from the source line. By reducing the capacitance between the source line and the pixel electrode, it is possible to prevent deterioration of display quality.

In this structure, however, when a voltage is applied to the source line, an electric field is generated by the voltage, causing a change in the orientation of liquid crystal over a relatively wide range in the vicinity of the source line. Because the counter electrode is placed in a layer that is lower than the source line in the FFS mode liquid crystal display device according to related art, the electric field from the source line cannot be shielded. As a result, light leakage occurs in the vicinity of the source line. In order to block the leakage light in the vicinity of the source line, a black matrix to cover the source line and the vicinity of the source line is placed on the counter substrate side in the FFS mode liquid crystal display device according to related art. The black matrix is placed to overlap the source line and the relatively wide range in the vicinity of the source line. Thus, an invalid region (non-transmitting region) that does not contribute to display increases in the vicinity of the source line, causing a decrease in aperture ratio.

Further, in the FFS mode liquid crystal display device according to related art, the pixel electrode is placed in a separate layer from a drain electrode of a thin film transistor with an insulating layer interposed therebetween. In this structure, it is necessary to form a contact hole for electrically connecting the pixel electrode and the drain electrode. Accordingly, the structure needs to have the size necessary for forming the contact hole and a positional allowance around the contact hole. Because the region is a non-transmitting region that does not allow transmission of light, this is one cause of a further decrease in aperture ratio.

In light of the foregoing, it is desirable to provide an FFS mode liquid crystal display device capable of improving an aperture ratio and a method of manufacturing the same.

SUMMARY OF THE INVENTION

According to an aspect of an embodiment of the present invention, there is provided a liquid crystal display device including liquid crystal filled between a first substrate having a thin film transistor and a second substrate placed opposite to the first substrate, including a gate line placed in the same layer as a gate electrode of the thin film transistor on the first substrate, a gate insulating layer placed on the gate line, a source line placed in the same layer as a source electrode and a drain electrode of the thin film transistor and crossing the gate line with the gate insulating layer interposed therebetween, a pixel electrode placed at least partly directly over or under the drain electrode so as to directly overlap the drain electrode, an interlayer insulating layer to cover the pixel electrode, and a counter electrode placed on the interlayer insulating layer and having a slit to generate a fringe electric field with the pixel electrode, wherein the counter electrode is placed to overlap the gate line in at least part of area and connected to the counter electrode in an adjacent pixel across the gate line.

According to another aspect of an embodiment of the present invention, there is provided a method of manufacturing a liquid crystal display device including liquid crystal filled between a first substrate having a thin film transistor and a second substrate placed opposite to the first substrate, the method including the steps of forming a pixel electrode at least partly directly over or under a drain electrode of the thin film transistor so as to directly overlap the drain electrode, forming an interlayer insulating layer to cover the pixel electrode, and forming a counter electrode having a slit to generate a fringe electric field with the pixel electrode, on the interlayer insulating layer, wherein in the step of forming the counter electrode, the counter electrode is formed to overlap a gate line connected to a gate electrode of the thin film transistor in at least part of area so as to be connected to the counter electrode in an adjacent pixel across the gate line.

According to the embodiments of the present invention, it is possible to provide an FFS mode liquid crystal display device capable of improving an aperture ratio and a method of manufacturing the same.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
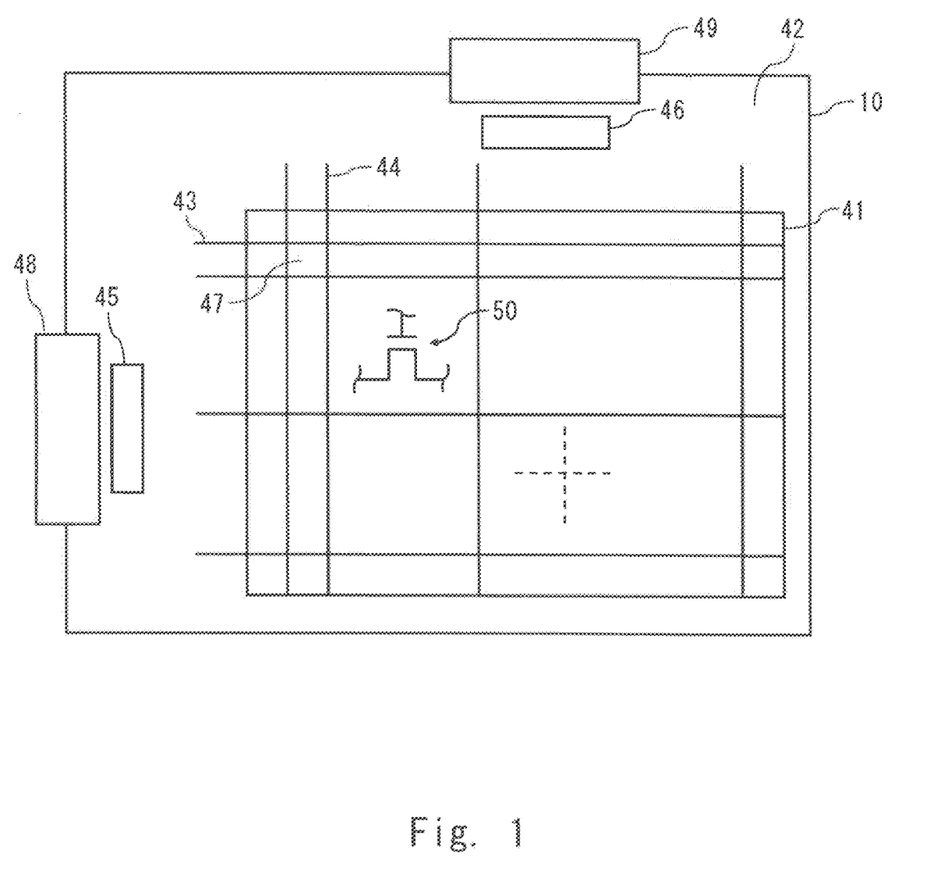
FIG. 1 is a front view showing the structure of a TFT array substrate to be used in a liquid crystal display device.

A liquid crystal display device according to an embodiment of the present invention is described hereinafter with reference to FIG. 1. FIG. 1 is a front view showing the structure of a thin film transistor (TFT) array substrate to be used in a liquid crystal display device. The liquid crystal display device according to the embodiment is an FFS mode liquid crystal display device in which a pixel electrode and a counter electrode are placed in a TFT array substrate. The overall structure of the liquid crystal display device is the same among first to third embodiments described below.

The liquid crystal display device according to the embodiment includes a substrate 10. The substrate 10 is an array substrate such as a TFT array substrate. The substrate 10 includes a display area 41 and a frame area 42 surrounding the display area 41. The display area 41 includes a plurality of gate lines (scanning signal lines) 43 and a plurality of source lines (display signal lines) 44. The plurality of gate lines 43 are arranged in parallel with each other. Likewise, the plurality of source lines 44 are arranged in parallel with each other. The gate lines 43 and the source lines 44 cross each other. Each area surrounded by the adjacent gate line 43 and source line 44 is a pixel 47. Thus, a plurality of pixels 47 are arranged in matrix in the substrate 10.

The frame area 42 of the substrate 10 includes a scanning signal driving circuit 45 and a display signal driving circuit 46. The gate lines 43 extend from the display area 41 to the frame area 42 and are connected to the scanning signal driving circuit 45 at the end of the substrate 10. Likewise, the source lines 44 extend from the display area 41 to the frame area 42 and are connected to the display signal driving circuit 46 at the end of the substrate 10. An external line 48 is connected in the vicinity of the scanning signal driving circuit 45. Further, an external line 49 is connected in the vicinity of the display signal driving circuit 46. The external lines 48 and 49 are wiring boards such as a flexible printed circuit (FPS), for example.

External signals are supplied to the scanning signal driving circuit 45 and the display signal driving circuit 46 through the external lines 48 and 49. The scanning signal driving circuit 45 supplies a gate signal (scanning signal) to the gate lines 43 based on an external control signal. The gate lines 43 are sequentially selected by the gate signal. On the other hand, the display signal driving circuit 46 supplies a display signal to the source lines 44 based on an external control signal and display data. A display voltage according to display data is thereby supplied to each pixel 47.

Each pixel includes at least one TFT 50. The TFT 50 is placed in the vicinity of the intersection of the source line 44 and the gate line 43. For example, the TFT 50 supplies a display voltage to a pixel electrode. Specifically, the TFT 50, which is a switching element, is turned on by the gate signal from the gate line 43. A display voltage is thereby applied from the source line 44 to the pixel electrode that is connected to a drain electrode of the TFT 50. The pixel electrode is placed opposite to a common electrode (counter electrode) having a slit with an insulating layer interposed therebetween. A fringe electric field corresponding to the display voltage is generated between the pixel electrode and the counter electrode. Further, an alignment layer (not shown) is placed on the surface of the substrate 10. The detailed structure of the pixel 47 is described later.

Further, a counter substrate is placed opposite to the substrate 10. The counter substrate is a color filter substrate, for example, and placed on the viewing side. The counter substrate includes a color filter, a black matrix (BM), an alignment layer and so on. A liquid crystal layer is placed between the substrate 10 and the counter substrate. In other words, liquid crystal is filled between the substrate 10 and the counter substrate. Further, a polarization plate, a retardation film and so on are placed on the outer sides of the substrate 10 and the counter substrate. Furthermore, a backlight unit or the like is placed on the non-viewing side of the liquid crystal display panel.

The liquid crystal is driven by the fringe electric field between the pixel electrode and the counter electrode. Thus, the orientation of the liquid crystal between the substrates varies. The polarization state of light passing through the liquid crystal layer thereby changes. In other words, the polarization state of linearly polarized light having passed through the polarization plate changes by the liquid crystal layer. Specifically, light from the backlight unit becomes linearly polarized light by the polarization plate on the array substrate side. Then, the linearly polarized light passes through the liquid crystal layer, so that its polarization state changes.

The amount of light passing through the polarization plate on the counter substrate side varies depending on the polarization state. Specifically, among the transmitted light that transmits through the liquid crystal display panel from the backlight unit, the amount of light passing through the polarization plate on the viewing side varies. The orientation of liquid crystal varies depending on a display voltage to be applied. Therefore, it is possible to change the amount of light passing through the polarization plate on the viewing side by controlling the display voltage. Thus, by varying the display voltage for each pixel, it is possible to display a desired image.

Figure 2:
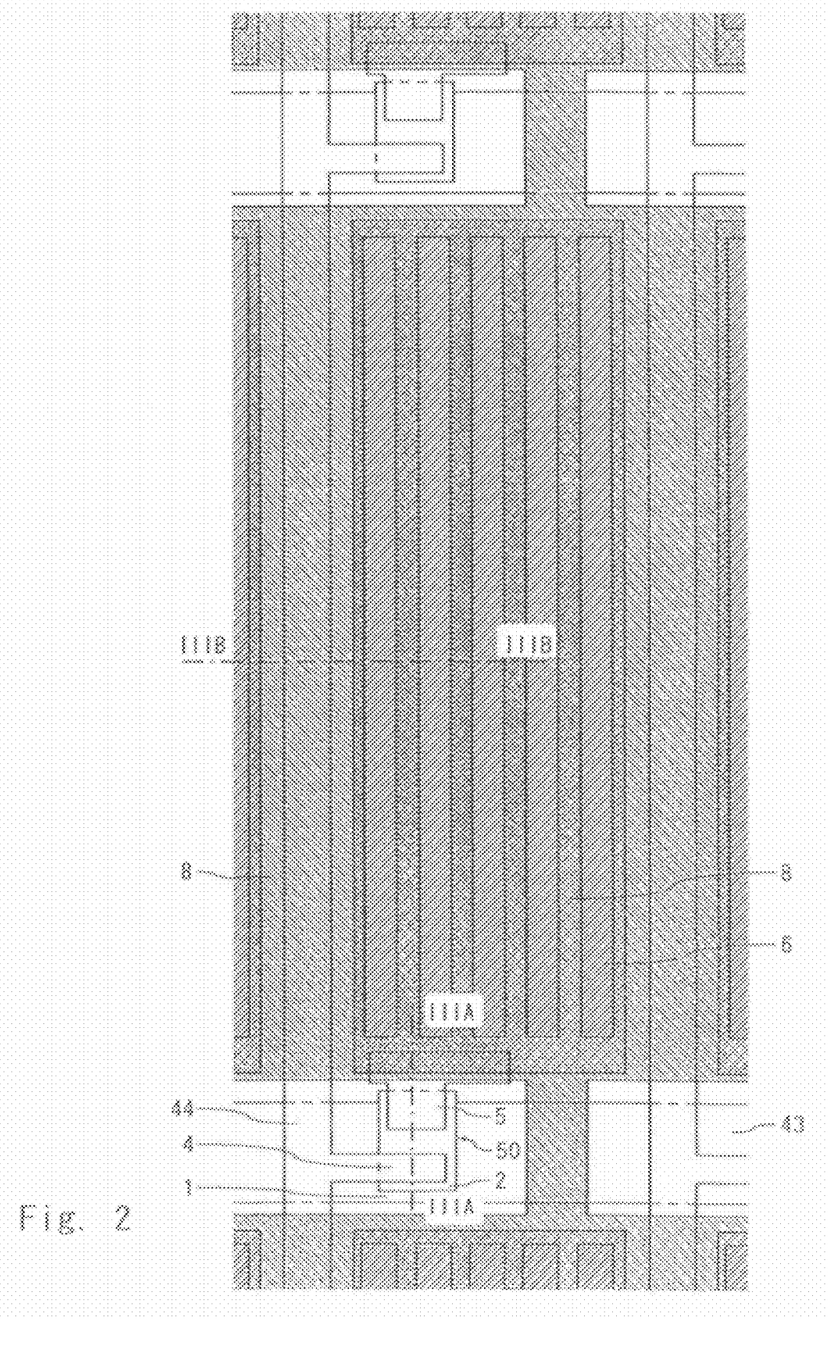
FIG. 2 is a plan view showing the pixel structure of the TFT array substrate according to a first embodiment.
Figure 3A:
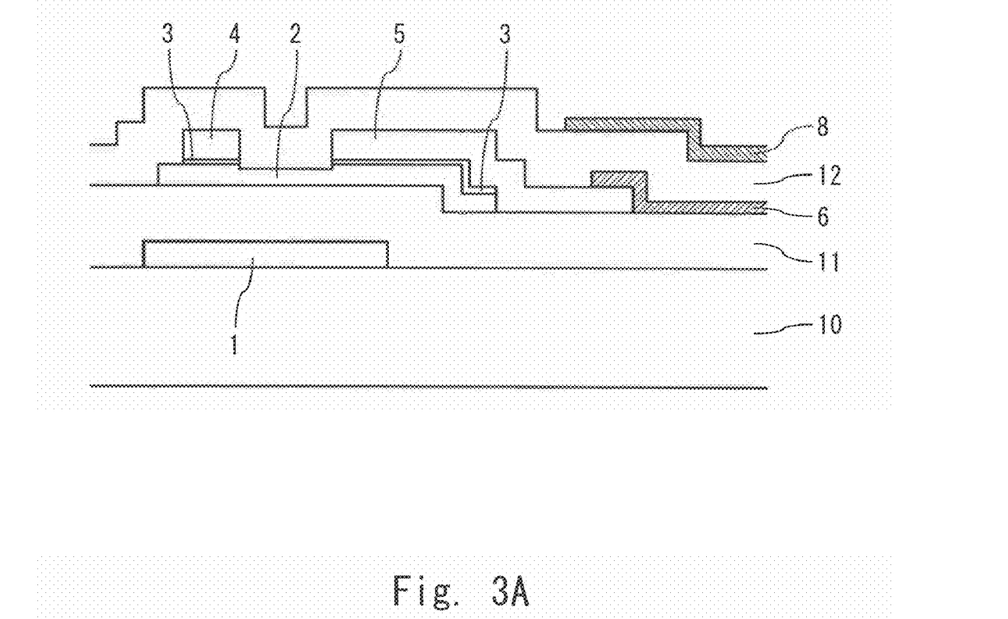
FIGS. 3A and 3B are sectional views showing the pixel structure of the TFT array substrate according to the first embodiment.
Figure 3B:
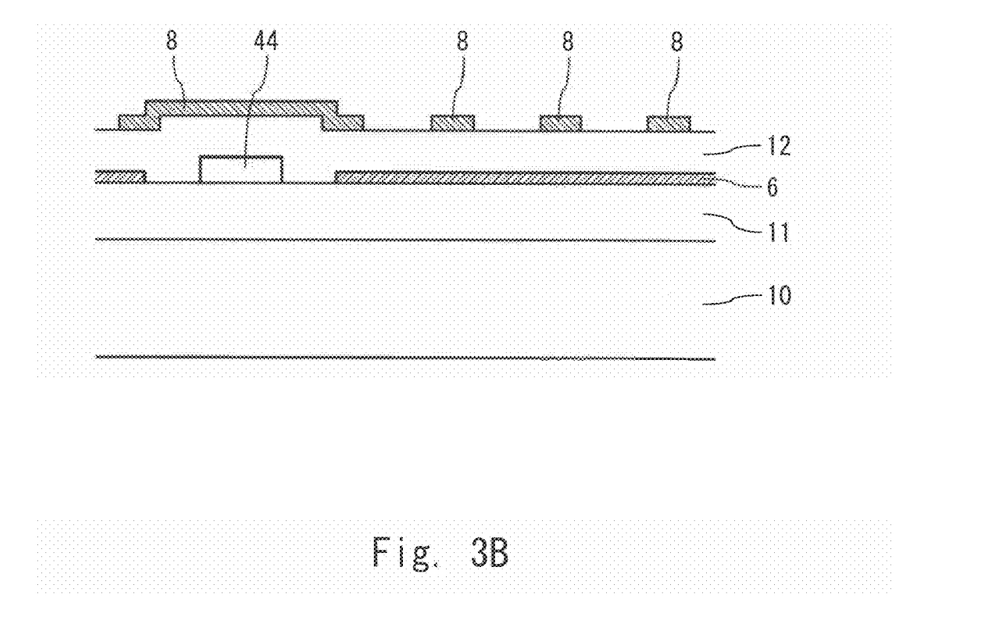

The pixel structure of the liquid crystal display device according to the embodiment is described hereinafter with reference to FIGS. 2, 3A and 3B. FIG. 2 is a plan view showing the pixel structure of the TFT array substrate according to the first embodiment. FIGS. 3A and 3B are sectional views showing the pixel structure of the TFT array substrate according to the first embodiment. FIG. 2 shows one of the pixels 47 of the TFT array substrate. FIG. 3A is a sectional view along line IIIA-IIIA of FIG. 2, and FIG. 3B is a sectional view along line IIIB-IIIB of FIG. 2. The structure with the channel-etch type TFT 50 is described hereinbelow by way of illustration.

Referring to FIGS. 2, 3A and 3B, the gate line 43, a part of which serves as a gate electrode 1, is placed on the transparent insulating substrate 10 such as glass. The gate line 43 extends linearly in one direction on the substrate 10. The gate electrode 1 and the gate line 43 are made of Cr, Al, Ta, Ti, Mo, W, Ni, Cu, Au or Ag, an alloy film made mainly of those or a stacked film of those, for example.

A gate insulating layer 11, which is a first insulating layer, is placed to cover the gate electrode 1 and the gate line 43. The gate insulating layer 11 is made of an insulating layer such as silicon nitride and silicon oxide. Further, in the formation area of the TFT 50, a semiconductor layer 2 is placed opposite to the gate electrode 1 with the gate insulating layer 11 interposed therebetween. In this example, the semiconductor layer 2 is placed on the gate insulating layer 11 so as to overlap the gate line 43, and the gate line 43 in the area that overlaps the semiconductor layer 2 serves as the gate electrode 1. The semiconductor layer 2 is made of amorphous silicon, polycrystalline polysilicon or the like, for example.

Further, ohmic contact layers 3 into which conductive impurity is doped are placed on both ends of the semiconductor layer 2. The parts of the semiconductor layer 2 corresponding to the ohmic contact layers 3 are source and drain regions, respectively. Specifically, the part of the semiconductor layer 2 corresponding to the ohmic contact layer 3 on the left side of FIG. 3A serves as the source region. The part of the semiconductor layer 2 corresponding to the ohmic contact layer 3 on the right side of FIG. 3A serves as the drain region. In this manner, the source and drain regions are formed at the both ends of the semiconductor layer 2. The part of the semiconductor layer 2 between the source and drain regions serves as a channel region. The ohmic contact layer 3 is not placed on the channel region of the semiconductor layer 2. The ohmic contact layer 3 is made of n-type amorphous silicon, n-type polycrystalline silicon or the like into which impurity such as phosphorus (P) is doped at high concentration, for example.

A source electrode 4 and a drain electrode 5 are respectively placed on the ohmic contact layers 3. Specifically, the source electrode 4 is placed on the ohmic contact layer 3 on the source region side. The drain electrode 5 is placed on the ohmic contact layer 3 on the drain region side. The channel-etch type TFT 50 is formed in this manner. The source electrode 4 and the drain electrode 5 extend to the outside of the channel region of the semiconductor layer 2. Thus, like the ohmic contact layers 3, the source electrode 4 and the drain electrode 5 are not placed on the channel region of the semiconductor layer 2.

The source electrode 4 extends to the outside of the channel region of the semiconductor layer 2 and is connected to the source line 44. The source line 44 is placed on the gate insulating layer 11 and linearly extends in the direction to cross the gate line 43 on the substrate 10. Thus, the source line 44 branches off and extends along the gate line 43 at the intersection with the gate line 43, to form the source electrode 4.

The drain electrode 5 extends to the outside of the channel region of the semiconductor layer 2 and is electrically connected to a pixel electrode 6. Thus, the drain electrode 5 has an extending portion that extends to the outside of the TFT 50. In the extending portion, the drain electrode 5 and the pixel electrode 6 are electrically connected. The source electrode 4, the drain electrode 5 and the source line 44 are made of Cr, Al, Ta, Ti, Mo, W, Ni, Cu, Au or Ag, an alloy film made mainly of those or a stacked film of those, for example.

In this embodiment, the pixel electrode 6 is placed in such a way that it partly directly overlaps the extending portion of the drain electrode 5 and is electrically connected to the drain electrode 5. The pixel electrode 6 extends from above the extending portion of the drain electrode 5 to the pixel 47. Specifically, as shown in FIGS. 2, 3A and 3B, the pixel electrode 6 is spaced from the source line 44 and the gate line 43 so as not to overlap them, and it is placed substantially all over the area surrounded by the source line 44 and the gate line 43 except the TFT 50. The pixel electrode 6 is made of a transparent conductive layer such as ITO.

Thus, the pixel electrode 6 of this embodiment is directly placed in the upper layer of the source electrode 4, the drain electrode 5 and the source line 44 with no insulating layer therebetween. Therefore, in this embodiment, an insulating layer is not interposed between the drain electrode 5 and the pixel electrode 6, which is different from the FFS mode liquid crystal display device according to related art. In this structure, there is no need to form a contact hole for electrically connecting the pixel electrode 6 to the drain electrode 5. Accordingly, the extending portion of the drain electrode 5 does not need to have the size necessary for forming the contact hole and a positional allowance around the contact hole, but only needs to have the size necessary for a part of the pixel electrode 6 to be placed directly in contact on the extending portion. It is thereby possible to reduce the size of the extending portion of the drain electrode 5 compared with that in the FFS mode liquid crystal display device according to related art, thus improving an aperture ratio.

Further, an interlayer insulating layer 12, which is a second insulating layer, is placed to cover the source electrode 4, the drain electrode 5, the source line 44 and the pixel electrode 6. The interlayer insulating layer 12 is made of an insulating layer such as silicon nitride and silicon oxide.

Furthermore, in this embodiment, a counter electrode 8 is placed on the interlayer insulating layer 12. The counter electrode 8 is placed opposite to the pixel electrode 6 with the interlayer insulating layer 12 interposed therebetween. The counter electrode 8 has a slit to generate a fringe electric field with the pixel electrode 6. As shown in FIG. 2, a plurality of slits are arranged substantially in parallel with the source lines 44. The slits are linear in the direction to cross the gate lines 43, for example. The counter electrode 8 is made of a transparent conductive layer such as ITO.

The counter electrode 8 is also placed to cover the source line 44. Specifically, as shown in FIGS. 2 and 3B, the counter electrode 8 that is wider than the source line 44 is placed opposite to the source line 44 with the interlayer insulating layer 12 interposed therebetween. The counter electrode 8 covers a large part of the source line 44 in the pixel portion. Thus, the large part of the source line 44 except the part crossing with the gate line 43 overlaps the counter electrode 8. In this structure, the electric field that is generated from the source line 44 is shielded by the counter electrode 8 and does not reach liquid crystal, thereby reducing change in the orientation state of the liquid crystal. This significantly reduces the light leakage due to the electric field generated by the source line 44, thus eliminating the need to form a black matrix over a wide range to cover the source line 44 on the counter substrate side. It is thereby possible to reduce the area of the non-transmitting region in the vicinity of the source line 44, thus improving an aperture ratio.

The width of the counter electrode 8 that covers the source line 44 is preferably larger than that of the source line 44 by 2 μm or more each side. The electric field from the source line 44 is thereby shielded effectively. The counter electrode 8 covers the source line 44 in this manner and is connected to the counter electrode 8 in the adjacent pixel across the source line 44.

Further, the counter electrode 8 is placed to cover at least part of the gate line 43. Specifically, the counter electrode 8 is placed to overlap at least part of the gate line 43 so as to be connected to the counter electrode 8 in the adjacent pixel across the gate line 43. In this example, the counter electrode 8 is placed to across the part of the gate line 43 which does not overlap the source line 44 or the TFT 50. In this structure, the counter electrode 8 is formed integrally with and electrically connected to the counter electrodes 8 of all the adjacent pixels 47. Because the counter electrodes 8 of all the pixels 47 in the display area 41 are electrically connected, it is possible to reduce the resistance of the counter electrodes 8. In the case of using a transparent conductive layer with a relatively high specific resistance for the counter electrode 8, a non-transmitting common line with a relatively low specific resistance is placed to supply a signal to the counter electrode 8 of each pixel 47 in the FFS mode liquid crystal display device according to related art. It is, however, not necessary to place the common line in this embodiment. This improves an aperture ratio.

A method of manufacturing the liquid crystal display device according to the embodiment is described hereinafter. Firstly, a conductive layer made of Cr, Al, Ta, Ti, Mo, W, Ni, Cu, Au or Ag, an alloy film made mainly of those or a stacked film of those is deposited all over the transparent insulating substrate 10 such as glass. For example, the conductive layer is formed all over the substrate 10 by sputtering or vapor deposition. Next, a resist is applied thereon, and the applied resist is exposed to light through a photomask. The resist is then developed, thereby pattering the resist. The series of processes is referred to hereinafter as photolithography. After that, the conductive layer is etched using the resist pattern as a mask, thereby removing the photoresist pattern. This process is referred to hereinafter as micropatterning. The gate electrode 1 and the gate line 43 are thereby patterned.

Then, a first insulating layer to serve as the gate insulating layer 11, a material of the semiconductor layer 2 and a material of the ohmic contact layer 3 are deposited in this order to cover the gate electrode 1 and the gate line 43. They are formed all over the substrate 10 by plasma CVD, atmospheric pressure CVD, low pressure CVD or the like, for example. Silicon nitride, silicon oxide or the like may be used as the gate insulating layer 11. The gate insulating layer 11 is preferably deposited a plurality of times in order to prevent short-circuit due to the occurrence of a defect such as a pinhole.

The material of the semiconductor layer 2 may be amorphous silicon, polycrystalline polysilicon or the like. The material of the ohmic contact layer 3 may be n-type amorphous silicon, n-type polycrystalline silicon or the like into which impurity such as phosphorus (P) is doped at high concentration, for example. After that, the material of the semiconductor layer 2 and the material of the ohmic contact layer 3 are patterned into an island shape above the gate electrode 1 by photolithography and micropatterning.

After that, in this embodiment, a conductive layer made of Cr, Al, Ta, Ti, Mo, W, Ni, Cu, Au or Ag, an alloy film made mainly of those or a stacked film of those is deposited so as to cover them. The conductive layer is formed by sputtering or vapor deposition, for example. Then, the conductive layer is patterned by photolithography and micropatterning, thereby forming the source electrode 4, the drain electrode 5 and the source line 44.

Further, a transparent conductive layer such as ITO is deposited all over the substrate 10 by sputtering or the like so as to cover the source electrode 4, the drain electrode 5 and the source line 44. Then, the transparent conductive layer is patterned by photolithography and micropatterning. The pixel electrode 6, a part of which is in direct contact on the drain electrode 5, is thereby formed.

Then, a layer to serve as the ohmic contact layer 3 is etched using the source electrode 4 and the drain electrode 5 as a mask. Specifically, the part of the ohmic contact layer 3 having an island shape which is not covered with the source electrode 4 and the drain electrode 5 is removed by etching. The semiconductor layer 2 having the channel region between the source electrode 4 and the drain electrode 5 and the ohmic contact layer 3 are thereby formed. Although the etching is performed using the source electrode 4 and the drain electrode 5 as a mask in this example, the etching of the ohmic contact layer 3 may be performed using the resist pattern that has been used when patterning the source electrode 4 and the drain electrode 5 as a mask. In this case, the ohmic contact layer 3 is etched before removing the resist pattern on the source electrode 4 and the drain electrode 5. Thus, the formation of the pixel electrode 6 and the etching of the ohmic contact layer 3 are performed in the opposite order.

After that, a second insulating layer to serve as the interlayer insulating layer 12 is deposited so as to cover the source electrode 4, the drain electrode 5, the source line 44 and the pixel electrode 6. For example, an inorganic insulating layer such as silicon nitride and silicon oxide is deposited as the interlayer insulating layer 12 all over the substrate 10 by CVD or the like. The channel region of the semiconductor layer 2 is thereby covered with the interlayer insulating layer 12. In the frame area 42, terminals (not shown) to be connected to the scanning signal driving circuit 45 or the display signal driving circuit 46 are formed in the same layer as the gate line 43 or the source line 44. Thus, after depositing the interlayer insulating layer 12, contact holes to reach the terminals are formed in the interlayer insulating layer 12 and the gate insulating layer 11 by photolithography and micropatterning.

Then, a transparent conductive layer such as ITO is deposited on the interlayer insulating layer 12 all over the substrate 10 by sputtering or the like. The transparent conductive layer is patterned by photolithography and micropatterning. The counter electrode 8 having slits are thereby formed opposite to the pixel electrode 6 with the interlayer insulating layer 12 interposed therebetween. The counter electrode 8 covers a large part of the source line 44 and at least part of the gate line 43 and formed integrally with the counter electrode 8 of the adjacent pixel. In the frame area 42, a gate terminal pad to be connected to a gate terminal through the contact hole is formed by the same transparent conducive layer as the counter electrode 8. Likewise, a source terminal pad to be connected to a source terminal through the contact hole is formed by the same transparent conducive layer as the counter electrode 8. By the processes described above, the TFT array substrate of the embodiment is completed.

On the TFT array substrate fabricated as above, an alignment layer is formed by the subsequent cell manufacturing process. Further, an alignment layer is formed also on a counter substrate that is fabricated separately. Then, an alignment process (rubbing process) is performed on the alignment layers so as to make micro scratches in one direction on contact surfaces with liquid crystal. After that, a sealing material is applied to attach the TFT array substrate and the counter substrate together. After attaching the TFT array substrate and the counter substrate, liquid crystal is filled through a liquid crystal filling port by vacuum filling method or the like. The liquid crystal filling port is then sealed. Further, polarization plates are attached to both sides of the liquid crystal cell that is formed in this manner, driving circuits are connected, and then a backlight unit is mounted. The liquid crystal display device of this embodiment is thereby completed.

As described in the foregoing, in this embodiment, liquid crystal is driven by a fringe electric field generating between the pixel electrode 6 and the counter electrode 8 with slits placed opposite to and in the upper layer of the pixel electrode 6 with the interlayer insulating layer 12 interposed therebetween. The pixel electrode 6 is placed directly on the drain electrode 5 with no insulating layer between. This structure eliminates the need to form a contact hole for electrically connecting the pixel electrode 6 and the drain electrode 5, thereby improving an aperture ratio.

Further, the counter electrode 8 is placed so as to cover the source line 44. The electric field generated from the source line 44 is thereby shielded by the counter electrode 8 that is placed on the liquid crystal side of the source line 44. Thus, the electric field generated from the source line 44 does not reach the liquid crystal, so that the light leakage in the vicinity of the source line 44 is significantly reduced. This eliminates the need to form a black matrix over a wide range in the vicinity of the source line 44 on the counter substrate side, thereby further improving an aperture ratio.

Furthermore, the counter electrode 8 is integrally formed among the adjacent pixels. Specifically, the counter electrode 8 is formed integrally with the counter electrodes 8 in the pixels that are adjacent with the source line 44 and the gate line 43 therebetween. Thus, the counter electrodes 8 in all the pixels 47 of the display area 41 are formed in an integral manner and electrically connected together. This reduces the resistance of the counter electrodes 8 and eliminates the need to form a non-transmitting common line, thereby further improving an aperture ratio.

Second Embodiment

Figure 4:
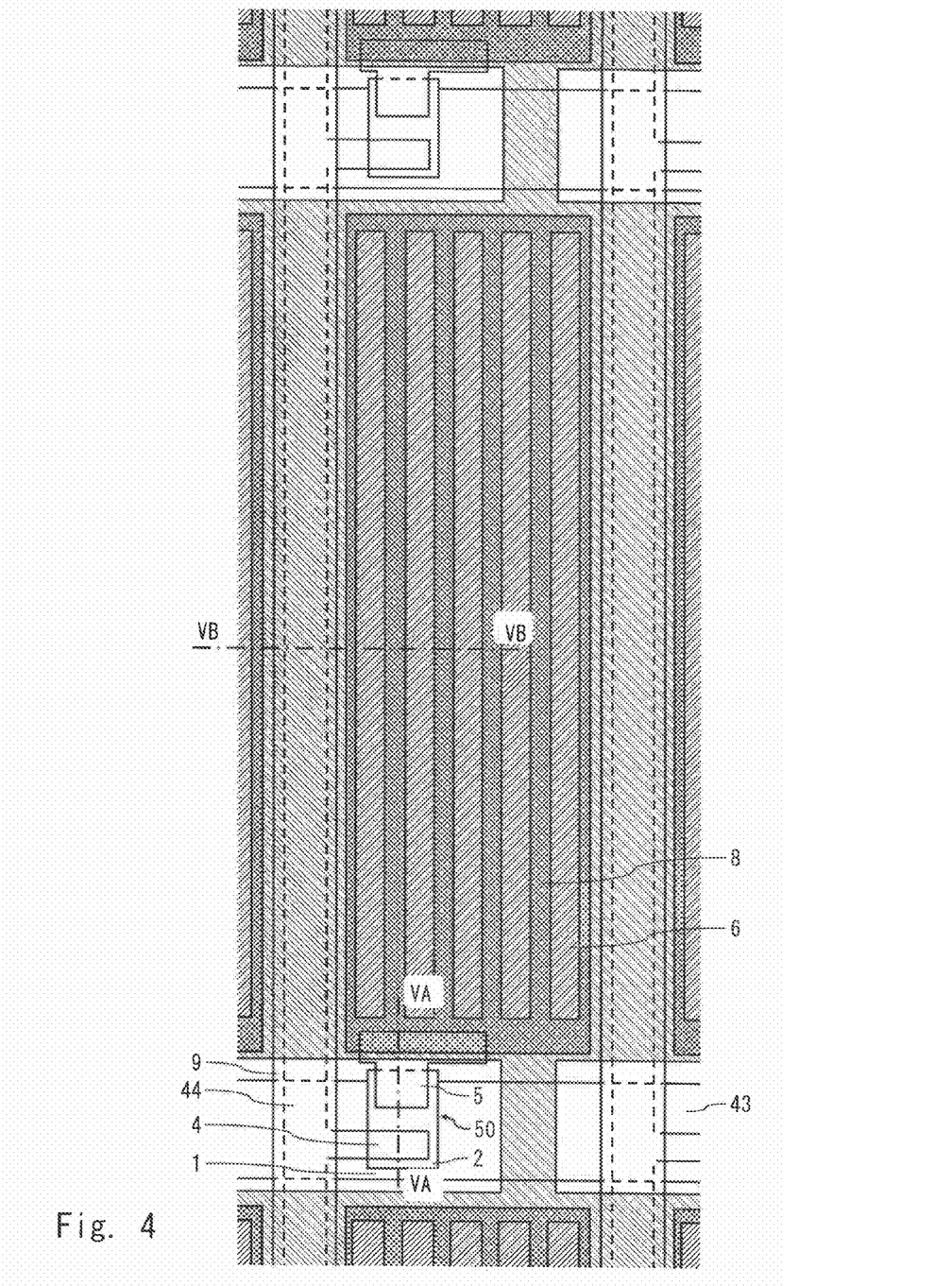
FIG. 4 is a plan view showing the pixel structure of the TFT array substrate according to a second embodiment.
Figure 5A:
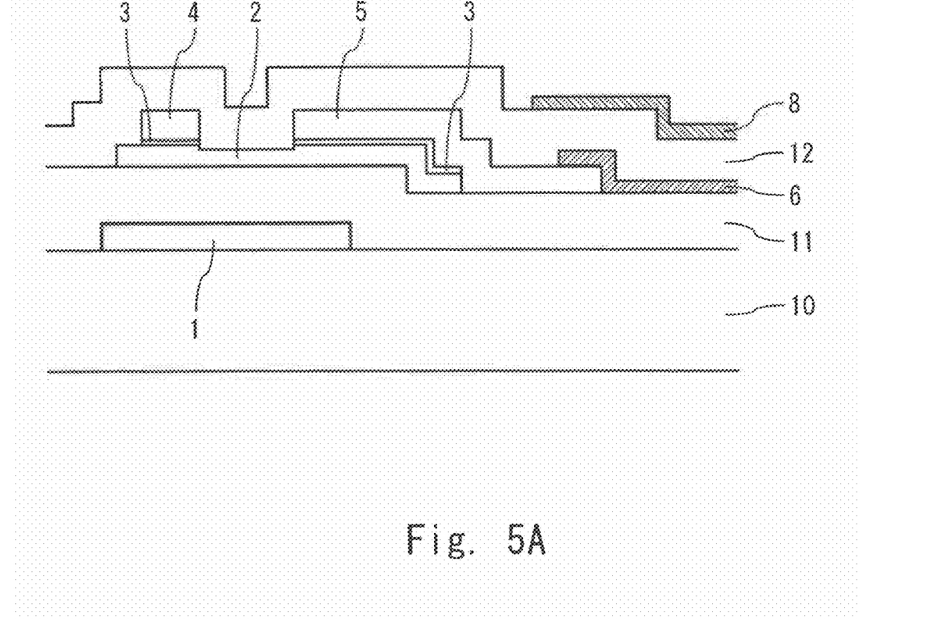
FIGS. 5A and 5B are sectional views showing the pixel structure of the TFT array substrate according to the second embodiment.
Figure 5B:
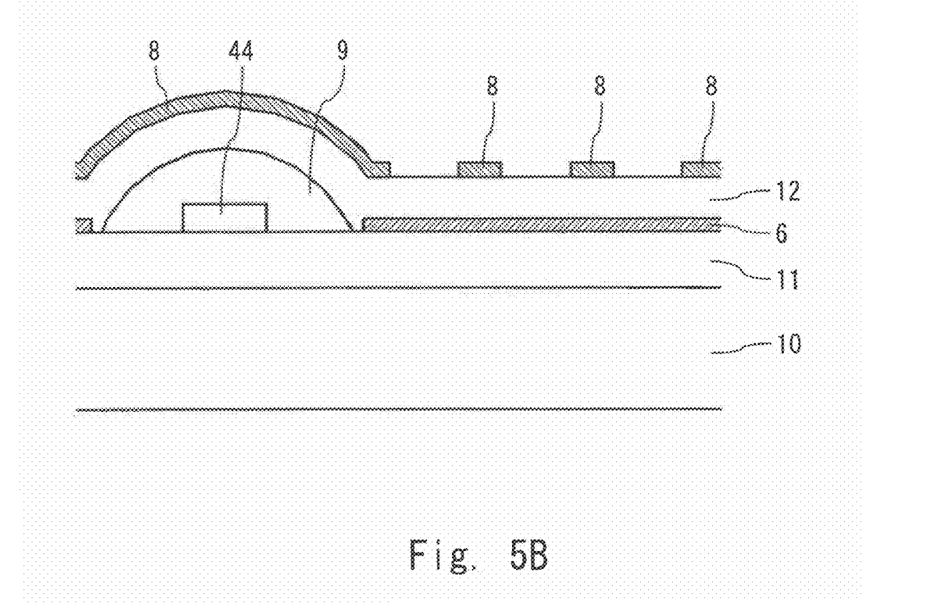

The pixel structure of a liquid crystal display device according to a second embodiment of the present invention is described hereinafter with reference to FIGS. 4, 5A and 5B. FIG. 4 is a plan view showing the pixel structure of the TFT array substrate according to the second embodiment. FIGS. 5A and 5B are sectional views showing the pixel structure of the TFT array substrate according to the second embodiment. FIG. 4 shows one of the pixels 47 of the TFT array substrate. FIG. 5A is a sectional view along line VA-VA of FIG. 4, and FIG. 5B is a sectional view along line VB-VB of FIG. 4.

In this embodiment, an organic layer 9 is added to the structure of the first embodiment. The other structure is the same as that of the first embodiment and not repeatedly described below. Referring to FIGS. 4, 5A and 5B, the organic layer 9 is placed between the source line 44 and the interlayer insulating layer 12 in this embodiment. The organic layer 9 is placed to cover the source line 44 and extends along the source line 44 between the adjacent pixel electrodes 6. The organic layer 9 is not placed in a light transmitting region. The width of the organic layer 9 is adjusted so as to be larger than the width of the source line 44 but not to overlap the pixel electrode 6.

The organic layer 9 is made of a photoresist material, for example. Although the organic layer 9 may be made of a highly transparent organic resin material, the transparency may be low because it is placed in a non-transmitting region. In this example, the organic layer 9 is made of a low-cost and low-transparency photoresist material that is generally used to manufacture an array substrate. This suppresses an increase in cost due to the addition of the process for forming the organic layer 9.

The TFT array substrate of this structure may be fabricated by adding the process of forming the organic layer 9 before forming the interlayer insulating layer 12 in the first embodiment. Specifically, after forming the semiconductor layer 2, the ohmic contact layer 3, the source electrode 4, the drain electrode 5, the source line 44 and the pixel electrode 6, a material of the organic layer 9 is applied to cover those layers. In this example, a photoresist is used for example. Then, the photoresist is patterned by photolithography. The organic layer 9 that covers the source line 44 is thereby formed. After that, the interlayer insulating layer 12 is formed above those layers. The other process is the same as that of the first embodiment and not repeatedly described below.

In the photolithography of the organic layer 9, backside exposure process may be used. Specifically, after applying a material of the organic layer 9, it is exposed to light from the backside (the side opposite to the applied surface). Thus, the patterns of the source line 44, the gate line 43, the source electrode 4, the drain electrode 5 and the semiconductor layer 2 are used as a mask. In this case, the organic layer 9 is formed to cover the source line 44, the gate line 43, the source electrode 4, the drain electrode 5 and the semiconductor layer 2. There is thus no need to use a new mask for patterning the organic layer 9, thereby preventing an increase in the number of masks. This suppresses an increase in cost due to the addition of the process for forming the organic layer 9.

As described in the foregoing, the organic layer 9 is placed to cover the source line 44 in this embodiment. Thus, two insulating layers, the organic layer 9 and the interlayer insulating layer 12, are placed between the source line 44 and the counter electrode 8, so that the insulating layer thickness increases. This reduces capacitance between the source line 44 and the counter electrode 8. The power consumption of the liquid crystal display device thereby decreases. This further reduces the occurrence of short-circuit between the source line 44 and the counter electrode 8. The yield of the liquid crystal display device thereby increases. Further, this embodiment has the same effect as the first embodiment, thus improving an aperture ratio.

Figure 6:
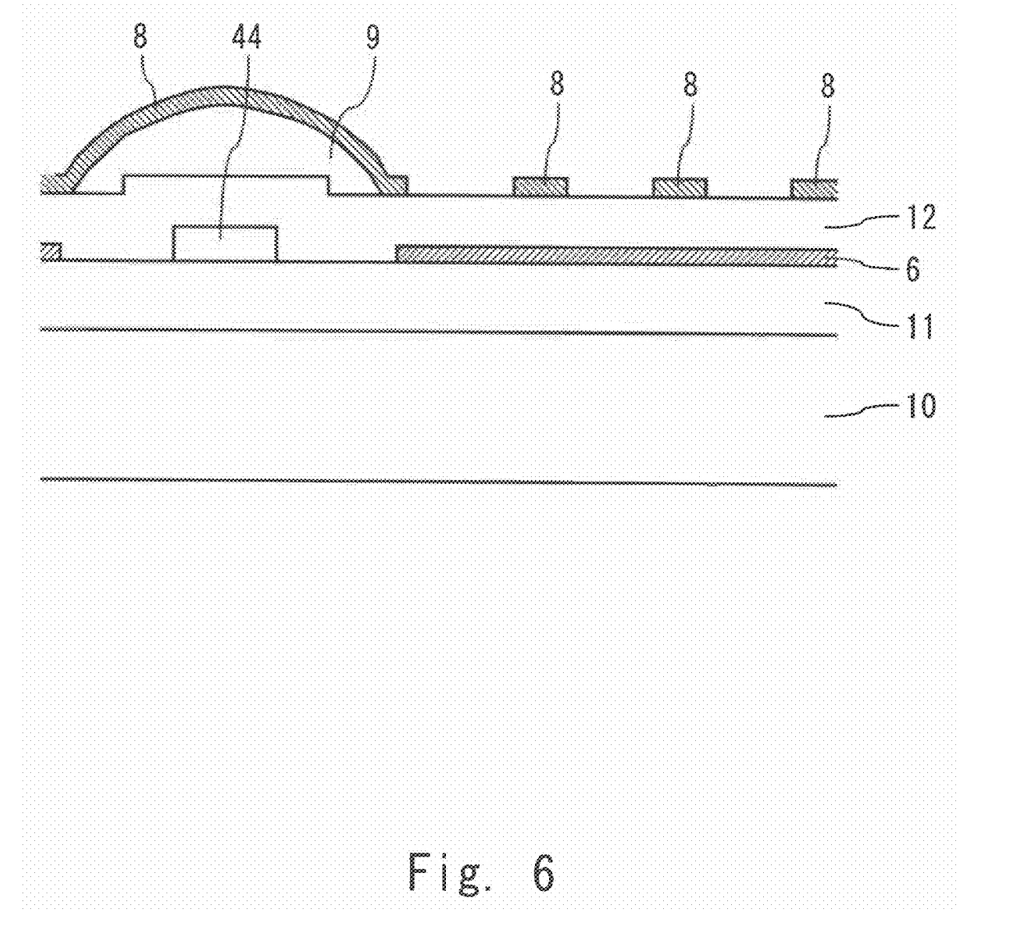
FIG. 6 is a sectional view showing the pixel structure of the TFT array substrate according to another example of the second embodiment.

Although the case where the organic layer 9 is placed between the source line 44 and the interlayer insulating layer 12 is described in this embodiment by way of illustration, the present invention is not limited thereto. FIG. 6 is a sectional view showing the pixel structure of the TFT array substrate according to another example of the embodiment. FIG. 6 shows a cross section corresponding to the VB-VB cross section in FIG. 4. Referring to FIG. 6, the organic layer 9 is placed between the interlayer insulating layer 12 and the counter electrode 8 in this structure. In this manner, the organic layer 9 may be placed on the interlayer insulating layer 12 so as to cover the source line 44. Specifically, the organic layer 9 is formed to be wider than the source line 44 and placed to cover the source line 44 with the interlayer insulating layer 12 interposed therebetween. The TFT array substrate of this structure may be fabricated by adding the process of forming the organic layer 9 after forming the interlayer insulating layer 12 in the first embodiment. Then, the counter electrode 8 is formed on top of the organic layer 9. The two insulating layers, the interlayer insulating layer 12 and the organic layer 9, are thereby placed between the source line 44 and the counter electrode 8, so that the insulating layer thickness increases. Therefore, this structure has the same effect as in the case where the organic layer 9 is placed between the source line 44 and the interlayer insulating layer 12.

Third Embodiment

Figure 7:
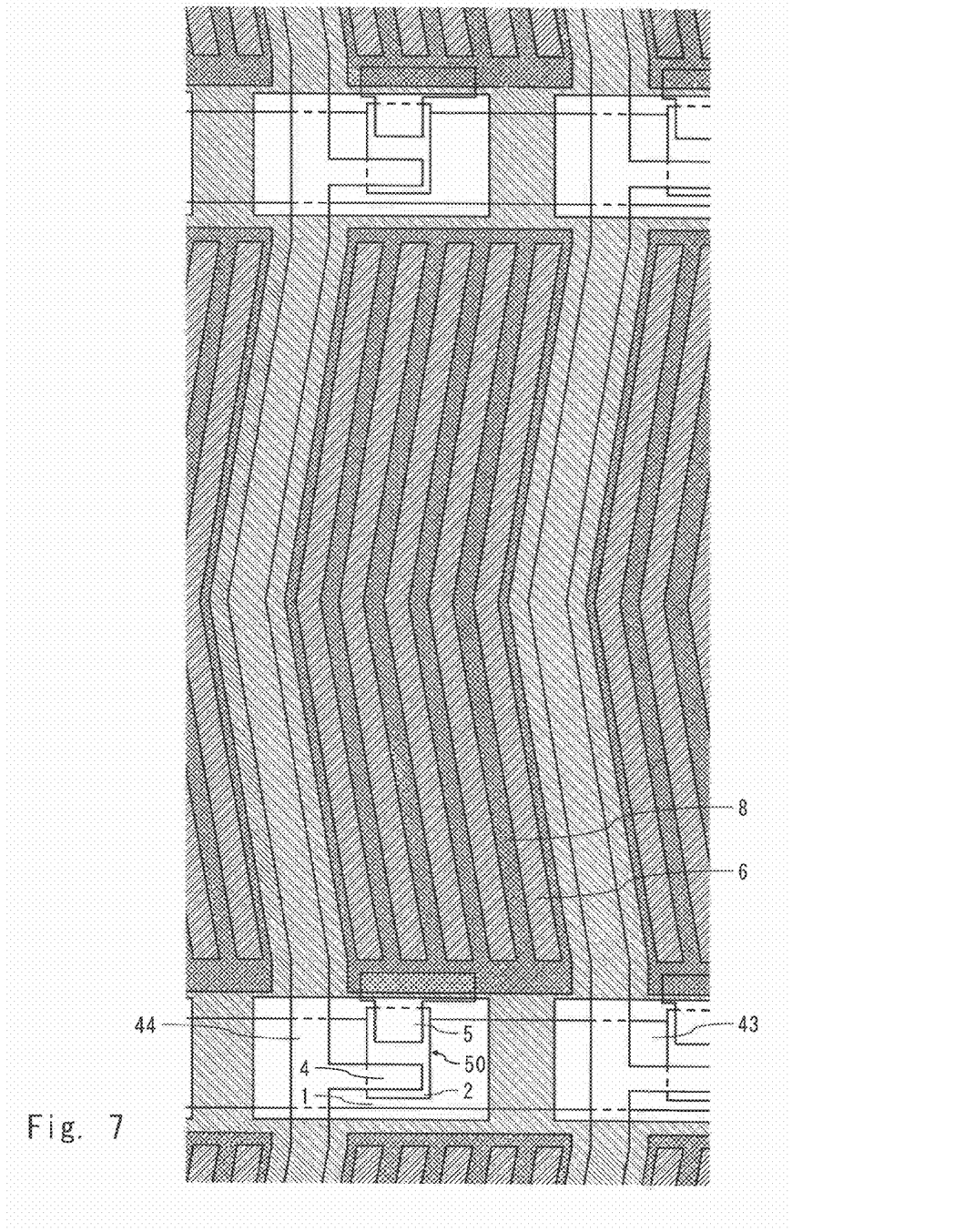
FIG. 7 is a plan view showing the pixel structure of the TFT array substrate according to a third embodiment.

The pixel structure of a liquid crystal display device according to a third embodiment of the present invention is described hereinafter with reference to FIG. 7. FIG. 7 is a plan view showing the pixel structure of the TFT array substrate according to the third embodiment. FIG. 7 shows one of the pixels 47 of the TFT array substrate. This embodiment is different from the first embodiment only in the shapes of the source line 44, the pixel electrode 6 and the counter electrode 8. The other structure is the same as that of the first embodiment and not repeatedly described below.

Although the counter electrode 8 of the first embodiment has the slits in one direction, the counter electrode 8 of this embodiment has the slits in two directions in each pixel. Generally, in the liquid crystal mode that displays an image by horizontally rotating liquid crystal molecules such as the FFS mode, there is a slight change in chromaticity caused by that the liquid crystal molecules are aligned in one direction. In view of this, the change in chromaticity can be compensated in each pixel if the liquid crystal is rotated in two directions in each pixel.

Referring to FIG. 7, the counter electrode 8 has slits in two directions. The slits are formed at given inclination angles with respect to the direction perpendicular to the gate line 43. Further, the slits are formed at two inclination angles including the two directions that are symmetric about the gate line 43. In this example, the slits are bent like an elbow by way of illustration. A plurality of slits are arranged substantially in parallel with the source line 44 in the area that overlaps the pixel electrode 6.

Further, in this embodiment, the source line 44 is formed into a shape along the slits. Thus, the source line 44 is bent between the adjacent gate lines 43. Likewise, the pixel electrode 6 is formed into a shape along the slits. Specifically, the pixel electrode 6 is bent and placed opposite to the elbow-shaped slits of the counter electrode 8 with the interlayer insulating layer 12 interposed therebetween. In this manner, the source line 44 and the pixel electrode 6 are bent along the slits of the counter electrode 8, thereby suppressing a decrease in transmittance. A manufacturing method of this embodiment is the same as that of the first embodiment and thus not described.

As described in the foregoing, the slits of the counter electrode 8 are formed in two directions in each pixel in this embodiment. It is thereby possible to compensate a slight change in chromaticity caused by that the liquid crystal molecules are aligned in one direction in each pixel. The display quality is thereby improved. Further, this embodiment also has the same effect as the first embodiment, thus improving an aperture ratio.

Although the case where a part of the pixel electrode 6 is placed in contact on top of the drain electrode 5 is described by way of illustration in the first to third embodiments, it may be placed in contact under the drain electrode 5. Thus, the extending portion of the drain electrode 5 is placed in direct contact on top of the pixel electrode 6. In this case, the process of forming the source electrode 4, the drain electrode 5 and the source line 44 and the process of forming the pixel electrode 6 are performed in the opposite order. Thus, the source electrode 4, the drain electrode 5 and the source line 44 are formed after forming the pixel electrode 6.

Further, although the formation of the source electrode 4, the drain electrode 5 and the source line 44 and the formation of the pixel electrode 6 are performed by different photolithography processes, they may be performed by one photolithography process. Specifically, after patterning the layer to serve as the semiconductor layer 2 and the layer to serve as the ohmic contact layer 3 into island shapes on the gate electrode 1, a transparent conductive layer to serve as the pixel electrode 6 and an electrode layer to serve as the source electrode 4, the drain electrode 5 and the source line 44 are deposited sequentially. Then, photolithography is performed using multi-step exposure such as halftone and graytone, thereby forming a resist pattern having a difference in thickness. In this step, a thick portion of the resist pattern is formed on the formation area of the source electrode 4, the drain electrode 5 and the source line 44, and a thin portion of the resist pattern is formed on the formation area of the pixel electrode 6. The electrode layer and the transparent conductive layer are etched using the resist pattern as a mask.

After that, the resist pattern having a difference in thickness is ashed to remove the thin portion of the resist pattern. Then, the electrode layer on the formation area of the pixel electrode 6 is etched away using the resist pattern with the thin portion being removed as a mask. The source electrode 4, the drain electrode 5, the source line 44 and the pixel electrode 6 are thereby formed in the same photolithography process. The number of photolithography processes can be thereby reduced. In this case, the source electrode 4, the drain electrode 5 and the source line 44 are the stacked film in which the same transparent conductive layer as the pixel electrode 6 is placed in the lower layer.

Although the liquid crystal display device including the channel-etch type TFT 50 is described in the first to third embodiments, it may include another type of the TFT 50, such as a top-gate type. Further, although a transmissive liquid crystal display device is described in the above embodiments, the present invention is not limited thereto. For example, a transflective liquid crystal display device may be used instead. In this case, the extending portion of the drain electrode 5 is enlarged. The area in which the drain electrode 5 overlaps the pixel electrode 6 thereby increases, so that this area functions as a light reflector. Furthermore, although the case where the direction of the slits of the counter electrode 8 is in parallel with the source line 44 is described in the above embodiments, the present invention is not limited thereto. The direction of the slits of the counter electrode 8 is not only in parallel with the source line 44 but may be a given direction or a combination of given different directions. The first to third exemplary embodiments can be combined as desirable by one of ordinary skill in the art.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device including liquid crystal filled between a first substrate having a thin film transistor and a second substrate placed opposite to the first substrate, comprising:

a gate line placed in the same layer as a gate electrode of the thin film transistor on the first substrate;

a gate insulating layer placed on the gate line;

a source line placed in the same layer as a source electrode and a drain electrode of the thin film transistor and crossing the gate line with the gate insulating layer interposed therebetween;

a pixel electrode placed at least partly directly over or under the drain electrode so as to directly overlap the drain electrode;

an interlayer insulating layer to cover the pixel electrode; and a counter electrode placed on the interlayer insulating layer and having a plurality of slits to generate a fringe electric field with the pixel electrode, wherein the counter electrode is placed to overlap the source line in a given area, is placed to overlap at least a portion of the gate line to connect to a counter electrode of an adjacent pixel across the gate line, and is placed so as to not overlap the gate line in an area where the source line and the gate line overlap, the source line includes two directions at given inclination angles, the two directions being symmetric about an axis parallel to the gate line, the plurality of slits include two directions substantially parallel to the two directions included in the source line, and the pixel electrode is plate shaped and chevron shaped including two directions at given inclination angles, the two directions included in the pixel electrode being symmetric about an axis parallel to the gate line.

2. The liquid crystal display device according to claim 1, wherein
the counter electrode is connected to a counter electrode in an adjacent pixel across the source line.

3. The liquid crystal display device according to claim 2, wherein
the counter electrode in the area to overlap the source line is wider than the source line by 2 μm or more each side.

4. The liquid crystal display device according to claim 2, further comprising:
an organic layer placed between the source line and the counter electrode and covering the source line.

5. The liquid crystal display device according to claim 1, wherein the counter electrode is placed not to overlap the thin film transistor.

6. The liquid crystal display device according to claim 1, wherein an edge on the source line side of the counter electrode is chevron shaped including two directions at given inclination angles, the two directions included in the counter electrode being symmetric about an axis parallel to the gate line.

7. The liquid crystal display device according to claim 1, wherein the pixel electrode is placed at least partly directly under the drain electrode.

8. The liquid crystal display device according to claim 1, wherein the pixel electrode covers two or more slits in the counter electrode.

9. The liquid crystal display device according to claim 1, wherein the pixel electrode is placed at least partly directly over the drain electrode.

10. The liquid crystal display device according to claim 1, wherein the plurality of slits are placed directly above the pixel electrode.

11. A method of manufacturing a liquid crystal display device including liquid crystal filled between a first substrate having a thin film transistor and a second substrate placed opposite to the first substrate, the method comprising the steps of:
forming a pixel electrode at least partly directly over or under a drain electrode of the thin film transistor so as to directly overlap the drain electrode;
forming an interlayer insulating layer to cover the pixel electrode; and
forming a counter electrode having a plurality of slits to generate a fringe electric field with the pixel electrode, on the interlayer insulating layer, so that the counter electrode is placed to overlap the source line in a given area, the counter electrode is placed to overlap at least a portion of the gate line to connect to a counter electrode of an adjacent pixel across the gate line, and the counter electrode is placed so as to not overlap the gate line in an area where the source line and the gate line overlap, wherein the source line includes two directions at given inclination angles symmetric about an axis parallel to the gate line, the plurality of slits include two directions substantially parallel to the two directions included in the source line, and the pixel electrode is plate shaped and chevron shaped including two directions at given inclination angles, the two directions included in the pixel electrode being symmetric about an axis parallel to the gate line.

12. The method of manufacturing the liquid crystal display device according to claim 11, wherein the counter electrode is connected to a counter electrode in an adjacent pixel across the source line.

13. The method of manufacturing the liquid crystal display device according to claim 12, wherein
in the step of forming the counter electrode, the counter electrode in the area to overlap the source line is formed to be wider than the source line by 2 μm or more each side.

14. The method of manufacturing the liquid crystal display device according to claim 12, further comprising the step of:
forming an organic layer to cover the source line before forming the interlayer insulating layer, or forming an organic layer to cover the source line with the interlayer insulating layer interposed therebetween after forming the interlayer insulating layer.

15. The method of manufacturing the liquid crystal display device according to claim 11, wherein the counter electrode is placed not to overlap the thin film transistor.

16. The method of manufacturing the liquid crystal display device according to claim 11, wherein an edge on the source line side of the counter electrode is chevron shaped including two directions at given inclination angles, the two directions included in the counter electrode being symmetric about an axis parallel to the gate line.

17. A liquid crystal display device including liquid crystal filled between a first substrate having a thin film transistor and a second substrate placed opposite to the first substrate, comprising:
a gate line placed in the same layer as a gate electrode of the thin film transistor on the first substrate;
a gate insulating layer placed on the gate line;
a source line placed in the same layer as a source electrode and a drain electrode of the thin film transistor and crossing the gate line with the gate insulating layer interposed therebetween;
a pixel electrode placed at least partly directly over or under the drain electrode so as to directly overlap the drain electrode;
an interlayer insulating layer to cover the pixel electrode; and
a counter electrode placed on the interlayer insulating layer and having a plurality of slits to generate a fringe electric field with the pixel electrode, wherein the counter electrode is placed to overlap the source line in a given area, the source line includes two directions at given inclination angles, the two directions being symmetric about an axis parallel to the gate line, the plurality of slits include two directions substantially parallel to the two directions included in the source line, the pixel electrode is plate shaped and chevron shaped including two directions at given inclination angles, the two directions included in the pixel electrode being symmetric about an axis parallel to the gate line, and the counter electrode is placed not to overlap the thin film transistor.

18. The liquid crystal display device according to claim 17, wherein the counter electrode is connected to a counter electrode in an adjacent pixel across the source line.

19. The liquid crystal display device according to claim 18, wherein the counter electrode in the area to overlap the source line is wider than the source line by 2 µm or more each side.

20. The liquid crystal display device according to claim 18, further comprising:
an organic layer placed between the source line and the counter electrode and covering the source line.

* * * * *